8942X
I. Wood.
Churn.
Patented Jun. 26, 1836.
8,942-X
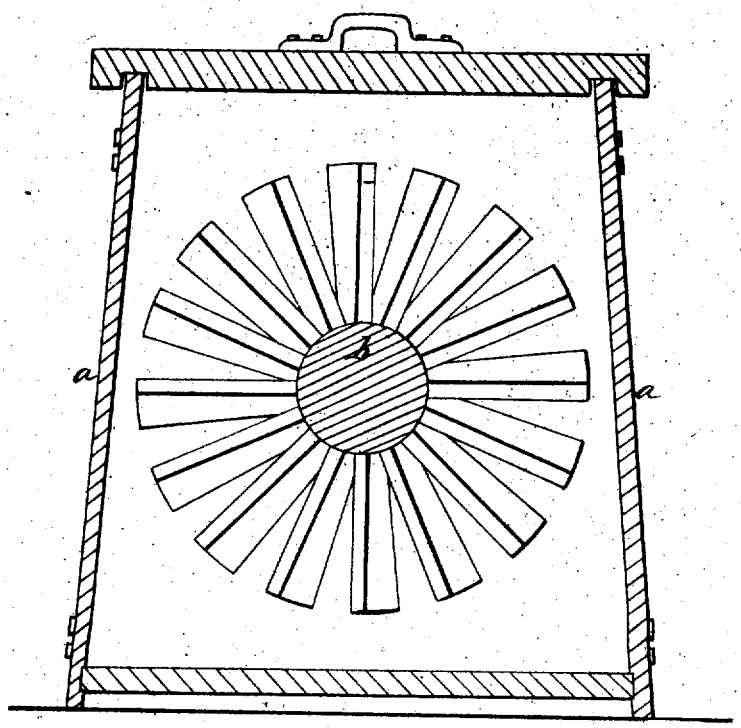
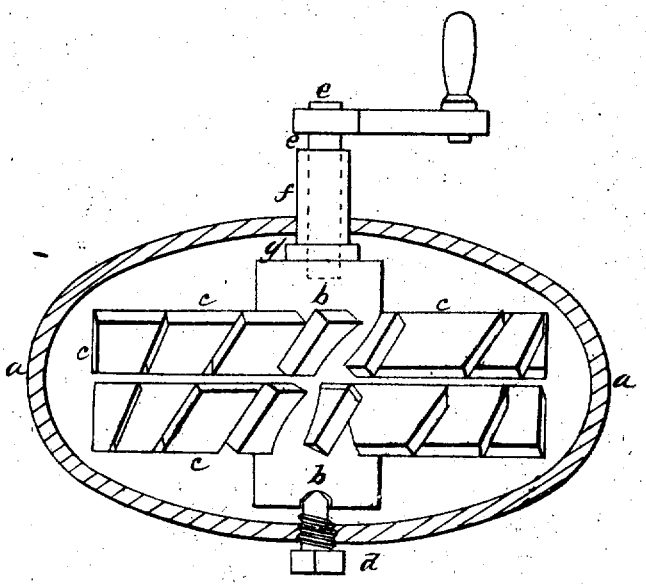

8942X June 26. 1835

Isaac Wood, resided two years. United States

Letters Patent.

The Schedule referred to in these letters Patent and making part
of the same, containing a description in the words of the said Isaac
Wood himself of his improvement in the making of Churns.

Be it known that I the said Isaac Wood have invented a
new and useful improvement, not known, or used before in
the making of Churns, which invention and the manner of using
it is as follows. Make a tub of an oval or eliptical form say
about 20 inches high - the longer diameter 18 inches in length and
the shorter 10 inches - let the tub gradually taper off from bottom
to top. In this hang horizontally, a wheel, crosswise - this wheel
consists of a wooden shaft 4 inches in diameter, in which is
inserted 16 paddles, each five inches long, two inches wide and
half an inch thick - set in rows of two, round the shaft, in spiral
position. In one end of this shaft is a center opening to let in the
pivot end of a tempering screw - and in the other end is a square mortice
to let in the tenon forming the inner end of the crank shaft that
passes through the water Joint. The water joint consists of a
metal tube about three inches long set in the side of the tub,
with the crank shaft passing through the center of the tube,
and made water tight by a collar on said shaft turned and fitted
to the end of the tube on the inside of the tub - on the same end
of this shaft is the tenon that enters the Mortice in the end of
the wheel shaft - on the outer [illegible] of this crank shaft which
passes throug said tube is fasten[illegible] the crank for turning the
machine opposite the insertion o[illegible]e and crank shaft
enters the tempering screw, which when turned in properly to
its place, closes up the collar of the crank shaft to the tube
and makes the joint water tight - Turn this screw back
and

[illegible]

8942X and the paddle wheel is unhung at pleasure, and may be taken out and cleaned. and thus leave the tub clear for cleansing also. The lid of the tub is an inch larger than the top of the tub rabited out all round and thus fitted to drop in and on the top, tight. Great expedition and ease is thus given to the process of making butter - and the whole Machine is cleansed without trouble or difficulty In witness whereof I have hereunto subscribed my name this 22d Oct. AD 1834.

Witnesses
S. W. Parker
Ezra Rogers

Isaac Wood

Ex'd
W.J.C.

[468 w.

(June 26. 1835)